United States Patent
Khetawat et al.

(10) Patent No.: US 10,498,767 B1
(45) Date of Patent: Dec. 3, 2019

(54) SYSTEMS AND METHODS FOR ENFORCING DATA LOSS PREVENTION (DLP) POLICIES DURING WEB CONFERENCES

(71) Applicant: Symantec Corporation, Mountain View, CA (US)

(72) Inventors: Rupesh Khetawat, Kharadi (IN); Chandini Sabhnani, Kharadi (IN)

(73) Assignee: Symantec Corporation, Mountain View, CA (US)

( * ) Notice: Subject to any disclaimer, the term of this patent is extended or adjusted under 35 U.S.C. 154(b) by 213 days.

(21) Appl. No.: 15/458,053

(22) Filed: Mar. 14, 2017

(51) Int. Cl.
*H04L 29/06* (2006.01)
*G06F 21/62* (2013.01)

(52) U.S. Cl.
CPC .......... *H04L 63/20* (2013.01); *G06F 21/6263* (2013.01); *H04L 63/105* (2013.01); *H04L 65/403* (2013.01)

(58) Field of Classification Search
CPC ..... H04L 63/20; H04L 65/403; H04L 63/105; G06F 21/6263
See application file for complete search history.

(56) References Cited

U.S. PATENT DOCUMENTS

| | | | | |
|---|---|---|---|---|
| 8,510,446 B1 * | 8/2013 | Pai | G06F 21/55 | 709/203 |
| 8,544,060 B1 * | 9/2013 | Khetawat | H04L 63/20 | 713/165 |
| 8,677,448 B1 * | 3/2014 | Kauffman | G06F 21/604 | 726/1 |
| 8,701,156 B1 * | 4/2014 | Agrawal | H04L 63/20 | 726/1 |
| 8,726,396 B1 * | 5/2014 | Dodke | G06F 21/6209 | 726/1 |
| 8,826,452 B1 * | 9/2014 | He | G06F 21/84 | 726/27 |
| 8,832,780 B1 * | 9/2014 | Sarin | G06F 21/6245 | 726/1 |
| 8,839,350 B1 * | 9/2014 | McNair | H04L 63/20 | 726/1 |
| 8,990,882 B1 * | 3/2015 | Koshy | G06F 21/62 | 726/1 |
| 9,342,697 B1 * | 5/2016 | Ren | G06F 21/60 | |
| 9,516,022 B2 * | 12/2016 | Borzycki | A63F 13/213 | |
| 9,825,928 B2 * | 11/2017 | Lelcuk | H04L 63/08 | |
| 2012/0291087 A1 * | 11/2012 | Agrawal | G06F 21/55 | 726/1 |

(Continued)

*Primary Examiner* — Abu S Sholeman
(74) *Attorney, Agent, or Firm* — FisherBroyles, LLP (57) ABSTRACT

A computer-implemented method for enforcing data loss prevention (DLP) policies during web conferences may include (i) detecting, by a computing device, an attempt by a presenter to initiate a web conference, (ii) determining that at least one item of content that a participant of the web conference attempts to share during the web conference contains sensitive data, (iii) identifying a DLP policy associated with the sensitive data, and (iv) securing the web conference against unauthorized dissemination of the sensitive data by enforcing the DLP policy on at least one participant machine participating in the web conference. Various other methods, systems, and computer-readable media are also disclosed.

19 Claims, 6 Drawing Sheets

(56) References Cited

U.S. PATENT DOCUMENTS

| | | | |
|---|---|---|---|
| 2013/0343232 A1* | 12/2013 | Terpstra | H04L 65/403 370/260 |
| 2014/0026182 A1* | 1/2014 | Pearl | G06F 21/60 726/1 |
| 2016/0117495 A1* | 4/2016 | Li | G06Q 10/103 726/1 |
| 2016/0212133 A1* | 7/2016 | Chenard | H04L 63/10 |
| 2017/0154030 A1* | 6/2017 | Moorjani | H04W 4/16 |
| 2018/0351956 A1* | 12/2018 | Verma | H04L 63/102 |

* cited by examiner

SYSTEMS AND METHODS FOR ENFORCING DATA LOSS PREVENTION (DLP) POLICIES DURING WEB CONFERENCES

BACKGROUND

Web conferences allow multiple people to participate in online meetings and share information over a network. During web conferences, data loss prevention (DLP) security solutions are generally dependent on network security and application security solutions. For example, traditional DLP software may attempt to prevent breaches to the network or to a web conference application. However, there may be a number of other potential risks, especially those caused by web conference attendees, that are not controlled by traditional solutions. For instance, a presenter may share sensitive material during a web conference without realizing that some attendees may not have the appropriate qualifications to view the sensitive material. Additionally, some web conferences may be left open to public attendance, which may allow individuals outside of an organization's target audience to view and participate. Furthermore, after a web conference ends, recordings of the conference or copies of documents presented during the conference may also be shared with others who do not have the qualifications. Thus, attendees and presenters may unknowingly violate data security policies. The instant disclosure, therefore, identifies and addresses a need for improved systems and methods for enforcing data loss prevention (DLP) policies during web conferences.

SUMMARY

As will be described in greater detail below, the instant disclosure describes various systems and methods for enforcing data loss prevention (DLP) policies during web conferences. In one example, a computer-implemented method for enforcing data loss prevention (DLP) policies during web conferences may include (i) detecting, by a computing device, an attempt by a presenter to initiate a web conference, (ii) determining that at least one item of content that a participant of the web conference attempts to share during the web conference contains sensitive data, (iii) identifying a DLP policy associated with the sensitive data, and (iv) securing the web conference against unauthorized dissemination of the sensitive data by enforcing the DLP policy on at least one participant machine participating in the web conference.

In one embodiment, the participant of the web conference may include the presenter initiating the web conference. Alternatively, the participant of the web conference may include an attendee of the web conference.

In some examples, determining that the item of content contains sensitive data may include preemptively receiving the DLP policy from the presenter before initiating the web conference. Additionally or alternatively, determining that the item of content contains sensitive data may include intercepting the item of content before sharing during the web conference, analyzing the item of content, and/or identifying the sensitive data in the item of content.

In one example, identifying the DLP policy associated with the sensitive data may include identifying a security level of the sensitive data. Additionally, identifying the DLP policy associated with the sensitive data may include identifying a set of security controls for the sensitive data.

In some embodiments, the participant machine may include a presenter machine used by the presenter initiating the web conference. Alternatively, the participant machine may include an attendee machine used by an attendee of the web conference.

In some examples, enforcing the DLP policy on the participant machine may include ensuring a DLP agent is running on the participant machine, identifying a permission level of a user of the participant machine, and selecting a security control based on the permission level of the user of the participant machine. In these examples, ensuring the DLP agent is running on the participant machine may include detecting a DLP agent application on the participant machine, detecting an integrated DLP agent for a web conference application, and/or initiating the DLP agent on the participant machine.

In some embodiments, securing the web conference against unauthorized dissemination of the sensitive data may include securing the item of content against unauthorized dissemination, preventing recording of the web conference, and/or applying a security control to a recording of the web conference. In these embodiments, securing the item of content against unauthorized dissemination may include preemptively preventing the participant from sharing the item of content and/or applying the security control to the item of content.

In one example, the computer-implemented method may further include determining that the item of content ceases to be shared during the web conference. In this example, the computer-implemented method may also include disabling a DLP agent running on the participant machine in compliance with the DLP policy.

In one embodiment, a system for implementing the above-described method may include (i) a detection module, stored in memory, that detects, by a computing device, an attempt by a presenter to initiate a web conference, (ii) a determination module, stored in memory, that determines that at least one item of content that a participant of the web conference attempts to share during the web conference contains sensitive data, (iii) an identification module, stored in memory, that identifies a DLP policy associated with the sensitive data, and (iv) a security module, stored in memory, that secures the web conference against unauthorized dissemination of the sensitive data by enforcing the DLP policy on at least one participant machine participating in the web conference. In addition, the system may include at least one processor that executes the detection module, the determination module, the identification module, and the security module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) detect, by the computing device, an attempt by a presenter to initiate a web conference, (ii) determine that at least one item of content that a participant of the web conference attempts to share during the web conference contains sensitive data, (iii) identify a DLP policy associated with the sensitive data, and (iv) secure the web conference against unauthorized dissemination of the sensitive data by enforcing the DLP policy on at least one participant machine participating in the web conference.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for enforcing data loss prevention (DLP) policies during web conferences. As will be explained in greater detail below, by controlling content presented during web conferences, the systems and methods described herein may prevent sensitive data from being shared with unauthorized parties. For example, by detecting that a document a presenter plans to share contains sensitive material, the disclosed systems and methods may select appropriate security controls to be enforced during the presentation of the document. Furthermore, by ensuring a DLP agent is running on all participant machines, the disclosed systems and methods may enforce different individual security policies for all participants of a web conference.

In addition, the systems and methods described herein may improve the functioning of a computing device by preventing unintentional data breaches of material on the computing device through tightened security measures. These systems and methods may also improve the fields of web conference security and/or network security by automatically selecting appropriate security policies associated with web conference content for computing devices on a network. Thus, these systems and methods may provide better DLP enforcement for web conferences.

Figure 1:
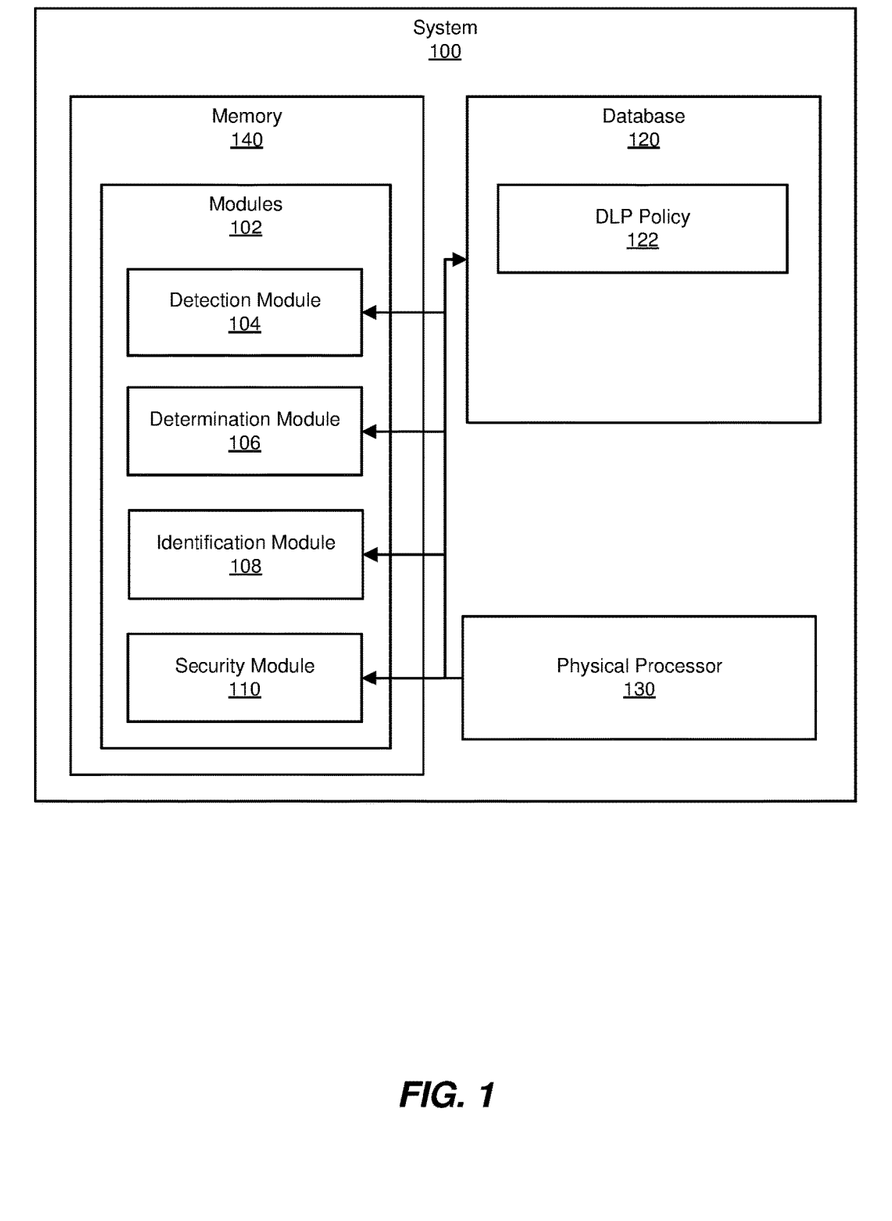
FIG. 1 is a block diagram of an example system for enforcing data loss prevention (DLP) policies during web conferences.
Figure 2:
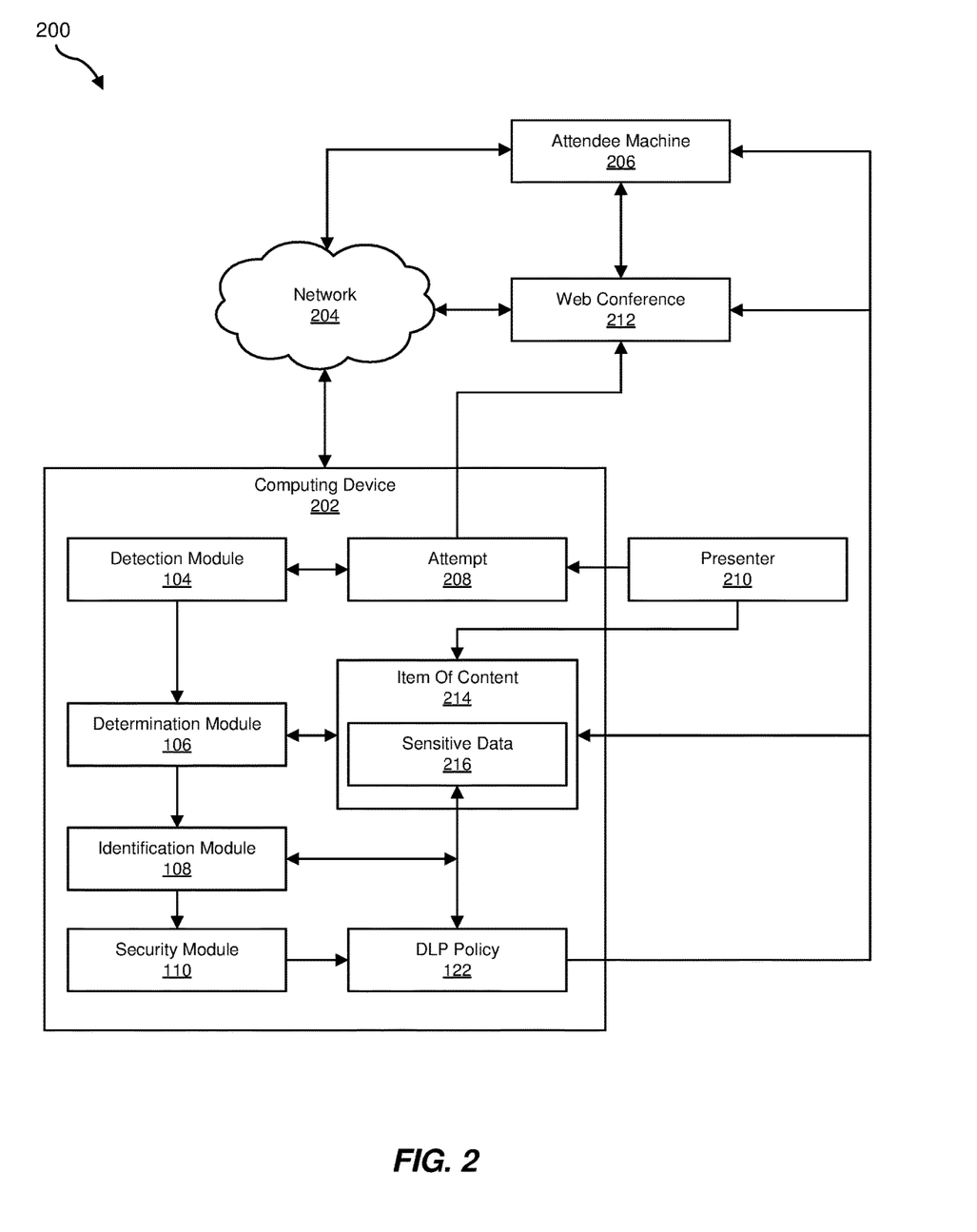
FIG. 2 is a block diagram of an additional example system for enforcing DLP policies during web conferences.

The following will provide, with reference to FIGS. 1 and 2, detailed descriptions of example systems for enforcing data loss prevention (DLP) policies during web conferences. Detailed descriptions of corresponding computer-implemented methods will also be provided in connection with FIG. 3. In addition, detailed descriptions of an example selection of security controls based on permission levels of example attendees will be provided in connection with FIG. 4. Furthermore, detailed descriptions of an example computing system and network architecture capable of implementing one or more of the embodiments described herein will be provided in connection with FIGS. 5 and 6, respectively.

FIG. 1 is a block diagram of example system 100 for enforcing data loss prevention (DLP) policies during web conferences. As used herein, the term "data loss prevention" generally refers to a strategy or security policies geared toward the prevention of transmission of certain data outside of an organization or a group of users. Notably, DLP policies may define what data is considered sensitive and which users have privileges to view or use the data.

As illustrated in FIG. 1, example system 100 may include one or more modules 102 for performing one or more tasks. For example, and as will be explained in greater detail below, modules 102 may include a detection module 104 that detects, by a computing device, an attempt by a presenter to initiate a web conference. The term "web conference," as used herein, generally refers to a presentation or meeting that is conducted through the use of a network of computing devices. Notably, a web conference may be held in a cloud environment, conducted over a network (e.g., network 204 in FIG. 2), held on a computing device accessed by other computing devices (e.g., computing device 202 and/or attendee machine 206 in FIG. 2), and/or instigated through a web conference application on one computing device and viewed through a web conference application on another computing device.

Modules 102 may additionally include a determination module 106 that determines that at least one item of content that a participant of the web conference attempts to share during the web conference contains sensitive data. Modules 102 may also include an identification module 108 that identifies a DLP policy associated with the sensitive data. Modules 102 may further include a security module 110 that secures the web conference against unauthorized dissemination of the sensitive data by enforcing the DLP policy on at least one participant machine participating in the web conference. Although illustrated as separate elements, one or more of modules 102 in FIG. 1 may represent portions of a single module or application or multiple modules or applications.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or attendee machine 206). One or more of modules 102 in FIG. 1 may also represent all or portions of one or more special-purpose computers configured to perform one or more tasks. Although illustrated as part of computing device 202 in FIG. 2, one or more of modules 102 in FIG. 1 may be executed by a separate computing device to manage computing device 202.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate enforcing data loss prevention (DLP) policies during web conferences. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include one or more databases, such as database 120. In one example, database 120 may be configured to store a DLP policy 122, which may include information about security controls for sensitive data. Database 120 may represent portions of a single database or computing device or a plurality of databases or computing devices. For example, database 120 may represent a portion of computing device 202 and/or attendee machine 206 in FIG. 2. Alternatively, database 120 in FIG. 1 may represent one or more physically separate devices capable of being accessed by a computing device, such as computing device 202 and/or attendee machine 206 in FIG. 2.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with an attendee machine 206 over a web conference 212 via a network 204. In one example, all or a portion of the functionality of modules 102 may be performed by computing device 202, attendee machine 206, and/or any other suitable computing system. Similarly, both attendee machine 206 and computing device 202 may be merged into a single machine or computing system such that the functionality of each of modules 102 is provided within a single device. All or a portion of the functionality of modules 102 may alternatively be performed by additional suitable computing devices or systems not illustrated in FIG. 2.

As will be described in greater detail below, one or more of modules 102 from FIG. 1 may, when executed by at least one processor of computing device 202 and/or attendee machine 206, enable computing device 202 and/or attendee machine 206 to prevent unauthorized sharing of sensitive content during web conferences. For example, and as will be described in greater detail below, detection module 104 may detect, by computing device 202, an attempt 208 by a presenter 210 to initiate web conference 212. Determination module 106 may determine that an item of content 214 that a participant of web conference 212 attempts to share during web conference 212 contains sensitive data 216. Identification module 108 may identify DLP policy 122 associated with sensitive data 216. Security module 110 may secure web conference 212 against unauthorized dissemination of sensitive data 216 by enforcing DLP policy 122 on at least one participant machine participating in web conference 212.

In the example of FIG. 2, and as will be explained in greater detail below, computing device 202 may first detect attempt 208 by presenter 210 to initiate web conference 212 on network 204. Computing device 202 may then determine that sensitive data 216 is part of item of content 214 that presenter 210 attempts to share during web conference 212. Next, computing device 202 may identify DLP policy 122 that applies to sensitive data 216 of item of content 214. Finally, computing device 202 may enforce DLP policy 122 on web conference 212 and attendee machine 206. Computing device 202 may also enforce DLP policy 122 on item of content 214 itself.

Computing device 202 and/or attendee machine 206 generally represents any type or form of computing device capable of reading computer-executable instructions. For example, computing device 202 and/or attendee machine 206 may represent endpoint devices running web conferencing software and/or DLP agent software. Additional examples of computing device 202 and/or attendee machine 206 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, and/or any other suitable computing device.

Network 204 generally represents any medium or architecture capable of facilitating communication or data transfer. In one example, network 204 may facilitate communication between computing device 202 and attendee machine 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
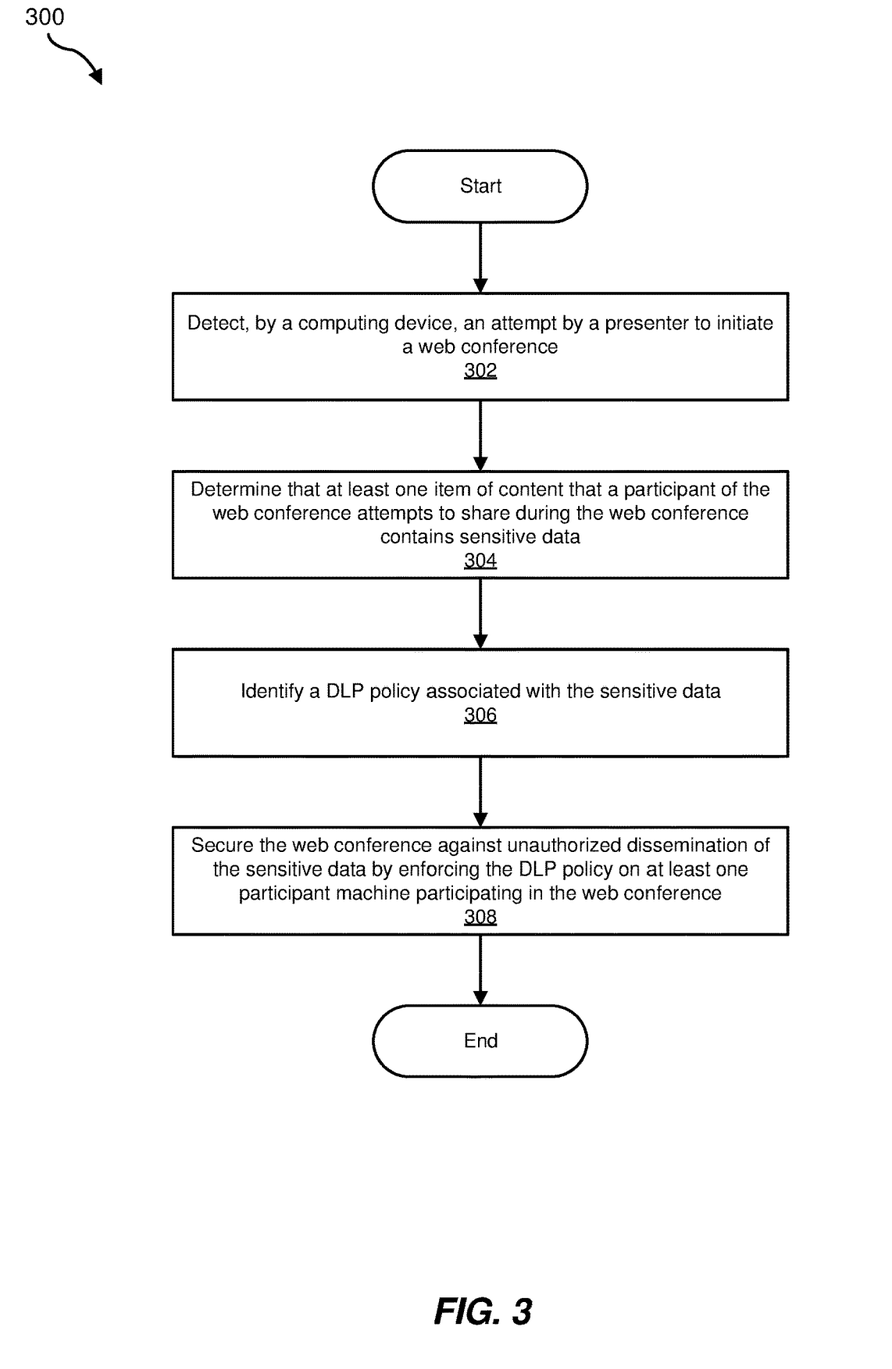
FIG. 3 is a flow diagram of an example method for enforcing DLP policies during web conferences.

FIG. 3 is a flow diagram of an example computer-implemented method 300 for enforcing data loss prevention (DLP) policies during web conferences. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may detect, by the computing device, an attempt by a presenter to initiate a web conference. For example, detection module 104 may, as part of computing device 202 in FIG. 2, detect attempt 208 by presenter 210 to initiate web conference 212.

Detection module 104 may detect attempt 208 to initiate web conference 212 in a variety of ways. In some examples, detection module 104 may act as a DLP agent and intercept attempt 208 while monitoring a web conference software application. Alternatively, presenter 210 may initiate web conference 212 through the DLP agent, and detection module 104 may receive attempt 208 directly from presenter 210. Detection module 104 may also act as part of the web conference application to receive attempt 208 from presenter 210.

Returning to FIG. 3, at step 304, one or more of the systems described herein may determine that at least one item of content that a participant of the web conference attempts to share during the web conference contains sensitive data. For example, determination module 106 may, as part of computing device 202 in FIG. 2, determine that item of content 214 that presenter 210 attempts to share during web conference 212 contains sensitive data 216.

Determination module 106 may determine that item of content 214 contains sensitive data 216 in a variety of ways. In one embodiment, the participant of web conference 212 who attempts to share item of content 214 may include presenter 210 who initiates web conference 212. In another embodiment, the participant may include an attendee of web conference 212. In this embodiment, the attendee of web conference 212 may have the ability to share or present item of content 214 from attendee machine 206, and determination module 106 may intercept item of content 214 on attendee machine 206 before presenting during web conference 212.

In some examples, determination module 106 may determine that item of content 214 contains sensitive data 216 by preemptively receiving DLP policy 122 from presenter 210 before initiating web conference 212. In these examples, presenter 210 may decide to present sensitive data 216 and may select DLP policy 122 in accordance with a privilege level required to view sensitive data 216. Presenter 210 may select DLP policy 122 when initiating web conference 212 and/or before presenting item of content 214 during web conference 212. For example, presenter 210 may determine that sensitive data 216 would be presented during web conference 212 and apply DLP policy 122 to web conference 212 as a whole. Alternatively, DLP policy 122 may be applied specifically to item of content 214. Presenter 210 may also determine what specific policies to apply, such as DLP policy 122, based on which attendees join or are expected to join web conference 212. Determination module 106 may then determine that web conference 212 will share sensitive data 216 and/or that item of content 214 contains sensitive data 216 based on DLP policy 122.

In alternate examples, determination module 106 may determine that item of content 214 contains sensitive data 216 by intercepting item of content 214 before sharing during web conference 212, analyzing item of content 214, and/or identifying sensitive data 216 in item of content 214. For example, determination module 106 may scan or review the content of all open documents on computing device 202. Determination module 106 may then determine that item of content 214 within the set of documents contains sensitive data. In this example, determination module 106 may determine item of content 214 contains sensitive data 216 based on detecting the material in item of content 214 and identifying sensitive data 216 and/or based on additional file data indicating a level of privilege required to access item of content 214. Determination module 106 may then determine that presenter 210 attempts to present sensitive data 216 during web conference 212.

Returning to FIG. 3, at step 306, one or more of the systems described herein may identify a DLP policy associated with the sensitive data. For example, identification module 108 may, as part of computing device 202 in FIG. 2, identify DLP policy 122 associated with sensitive data 216.

Identification module 108 may identify DLP policy 122 in a variety of ways. In some embodiments, identification module 108 may identify DLP policy 122 associated with sensitive data 216 by identifying a security level of sensitive data 216 and identifying a set of security controls for sensitive data 216. The term "security control," as used herein, generally refers to a security measure taken to provide computing security or minimize risks. Examples of security controls for sensitive data may include, without limitation, file password protection, security locks for users or user groups, read-only document settings, file tracking, prohibiting data copying, variations or combinations of one or more of the same, and/or any other suitable data security measures.

In one example, identification module 108 may identify DLP policy 122 as a policy preemptively selected by presenter 210. In this example, presenter 210 may select DLP policy 122 to apply to web conference 212 or to apply during presentation of item of content 214. In other examples, identification module 108 may identify DLP policy 122 based on the content or sensitivity of sensitive data 216 in item of content 214. In these examples, identification module 108 may refer to a database of DLP policies, such as database 120 in FIG. 1, and/or determine an appropriate policy based on security attributes of item of content 214.

In the above embodiments, the set of security controls for sensitive data 216 may depend on the security level of sensitive data 216 and/or permissions of specific participants. For example, sensitive data 216 may have a high security level that requires security controls to prevent copying of item of content 214 by any participant of web conference 212. As another example, sensitive data 216 may require specific user permission levels for access, and the set of security controls may restrict users and/or participants of web conference 212 who do not have the appropriate permissions from viewing item of content 214 while allowing access by participants with the required user permission levels.

Returning to FIG. 3, at step 308, one or more of the systems described herein may secure the web conference against unauthorized dissemination of the sensitive data by enforcing the DLP policy on at least one participant machine participating in the web conference. For example, security module 110 may, as part of computing device 202 in FIG. 2, secure web conference 212 against unauthorized dissemination of sensitive data 216 by enforcing DLP policy 122 on attendee machine 206 participating in web conference 212.

Security module 110 may secure web conference 212 in a variety of ways. In one example, the participant machine may include a presenter machine, such as computing device 202, used by presenter 210 to initiate web conference 212 and/or attendee machine 206 used by an attendee of web conference 212. In this example, security module 110 may enforce DLP policy 122 on computing device 202 and/or attendee machine 206.

In one embodiment, security module 110 may enforce DLP policy 122 on the participant machine by ensuring a DLP agent is running on the participant machine, identifying a permission level of a user of the participant machine, and selecting a security control based on the permission level of the user of the participant machine. The term "DLP agent," as used herein, generally refers to a software solution to provide DLP protection on a computing machine. Notably, the DLP agent may be integrated into a web conference application, interact with the web conference application as separate software, and/or include functions of a web conference application.

In the above embodiment, the DLP agent may search a database of permission levels to identify the permission level of the user and/or keep a record of potential permission levels and users of the participant machine. Security module 110 may then enforce DLP policy 122 based on the permission level of the user. For example, security module 110 may enforce security controls to prevent recording of web conference 212 based on a list of attendees of web conference 212. Alternatively, security module 110 may enforce security controls on a single participant machine and/or a single user of the machine.

In some examples, security module 110 may ensure the DLP agent is running on the participant machine by detecting a DLP agent application on the participant machine, detecting an integrated DLP agent for a web conference application, and/or initiating the DLP agent on the participant machine. For example, security module 110 may determine attendee machine 206 is running the DLP agent application during web conference 212. In another example, security module 110 may determine a machine outside of an organization attempts to participate in web conference 212. The machine may then be prompted to install the DLP agent application in addition to the web conference application and/or be provided with a lightweight version of the DLP agent to run during web conference 212. In this example, the lightweight version of the DLP agent may be dynamically installed and activated during web conference 212 or may be a plug-in software component that runs on the web conference application.

Figure 4:
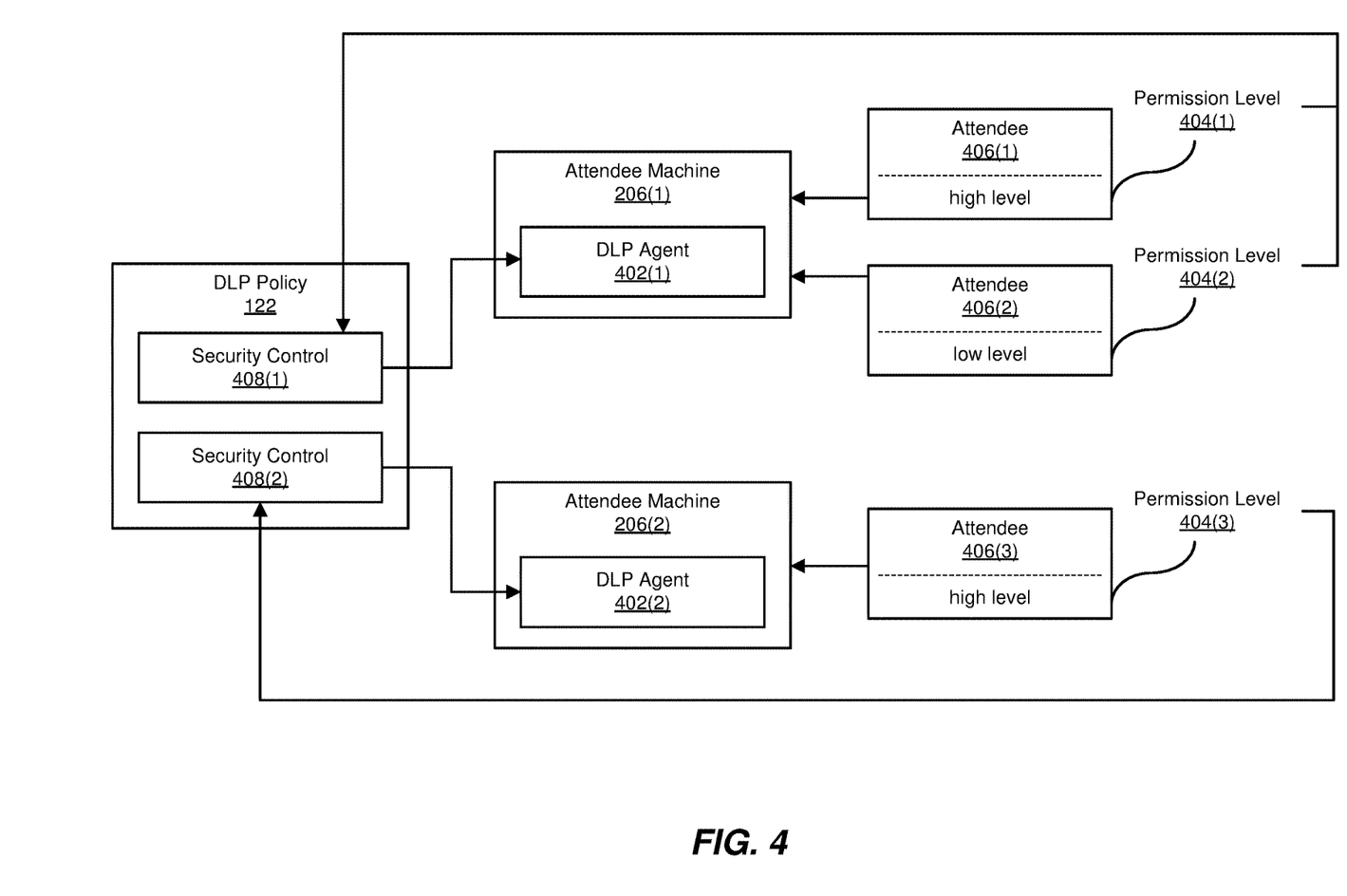
FIG. 4 is a block diagram of an example selection of security controls based on permission levels of example attendees.

As illustrated in FIG. 4, an attendee machine 206(1) and an attendee machine 206(2) may participate in web conference 212 of FIG. 2. An attendee 406(1) and an attendee 406(2) may be users of attendee machine 206(1), and an attendee 406(3) may be a user of attendee machine 206(2). Based on identifying a permission level 404(1) (e.g., "high level") and a permission level 404(2) (e.g., "low level"), security module 110 may determine sensitive data 216 is at risk of exposure to attendee 406(2) with low security permissions. Subsequently, security module 110 may enforce DLP policy 122 with a security control 408(1) to provide tighter security restrictions via a DLP agent 402(1) on attendee machine 206(1). In this example, attendee 406(2) may not attend web conference 212 but, as a user of attendee machine 206(1), still pose a security threat to sensitive data 216 presented during web conference 212 or any copies of sensitive data 216. Similarly, security module 110 may determine attendee 406(3) has appropriate security permissions and subsequently enforce a security control 408(2) with more relaxed security restrictions via a DLP agent 402(2) on attendee machine 206(2). In the example of FIG. 4, security module 110 may also ensure DLP agents 402(1) and 402(2) are installed on attendee machines 206(1) and 206(2) before applying DLP policy 122 and/or presenting web conference 212.

In some embodiments, security module 110 may secure web conference 212 against unauthorized dissemination of sensitive data 216 by securing item of content 214 against unauthorized dissemination, preventing recording of web conference 212, and/or applying a security control to a recording of web conference 212. For example, security module 110 may allow attendee machine 206 to record web conference 212 but apply password protection to the recording of web conference 212. Security module 110 may alternatively mark the recording of web conference 212 as sensitive in other ways, such as by tagging the file with special notations or preventing additional sharing. Security module 110 may also prevent specific participants and/or specific participant machines from recording web conference 212, based on participant permission levels.

In the above embodiments, security module 110 may also secure item of content 214 against unauthorized dissemination by preemptively preventing the participant from sharing item of content 214 and/or applying the security control to item of content 214. In these embodiments, when the participant, such as presenter 210 in FIG. 2, attempts to share item of content 214, security module 110 may prompt the participant with information about security and data loss risks associated with sharing item of content 214. Security module 110 may then receive input from the participant to apply DLP policy 122 with security controls to secure item of content 214 during presentation or prevent the sharing of item of content 214. For example, security module 110 may display a warning about an organization's DLP policies when presenter 210 attempts to share item of content 214. Presenter 210 may then accept the responsibilities of sharing item of content 214 and/or apply appropriate security controls associated with DLP policy 122. In further examples, security module 110 may apply the security control by disabling a download function, disabling a print screen capability, applying password protection to a copy or recording of item of content 214, and/or generally disabling a copy or record function on attendee machine 206 during the presentation of item of content 214. Security module 110 may also apply the security control to web conference 212 by preventing recording of web conference 212, preventing unauthorized attendees, restricting certain features of the web conference application, and/or other suitable security measures to prevent potential data breaches.

In one embodiment, the systems described herein may further include determining that item of content 214 ceases to be shared during web conference 212 and disabling a DLP agent running on the participant machine in compliance with DLP policy 122. For example, a guest attendee outside of the organization with a lightweight version of the DLP agent running during web conference 212 may be restricted by DLP policy 122 during presentation of item of content 214. After presentation of item of content 214 is completed, the systems described herein may determine that DLP policy 122 no longer applies and disable the DLP agent on the guest attendee's machine, such as disabling security controls that prevent recording web conference 212. In other examples, the systems described herein may automatically uninstall the DLP agent after web conference 212 concludes. Alternatively, DLP policy 122 may require the DLP agent to remain on participant machines after web conference 212 concludes in order to monitor and prevent potential unauthorized sharing of item of content 214.

As explained above in connection with method 300 in FIG. 3, the disclosed systems and methods may, by enforcing security policies on endpoint machines using a DLP agent, improve DLP solutions to protect data shared in web conferences. Specifically, the disclosed systems and methods may automatically detect any sensitive data that could be shared during a web conference. By ensuring a DLP agent is running on every machine participating in the web conference, the systems and methods described herein may then enforce DLP policies regarding the sensitive data via the DLP agent.

By identifying appropriate security controls for specific content and specific participants, the disclosed systems and methods may further enforce different DLP policies or controls for each endpoint machine participating in the web conference. In some examples, the systems and methods described herein may also allow presenters to preemptively apply DLP policies to web conferences when sensitive data is expected to be shared. Additionally, the systems and methods described herein may disable security controls on participant machines when sensitive data is no longer shared in a web conference.

As detailed above, by automatically selecting and enforcing DLP policies for sensitive data, the disclosed systems and methods may provide a more secure environment for sharing content in web conferences. Furthermore, by ensuring copies and recordings of sensitive material are classified as sensitive, the disclosed systems and methods may protect such data even after a web conference has ended. Thus, the systems and methods described herein may improve DLP solutions for web conferences.

Figure 5:
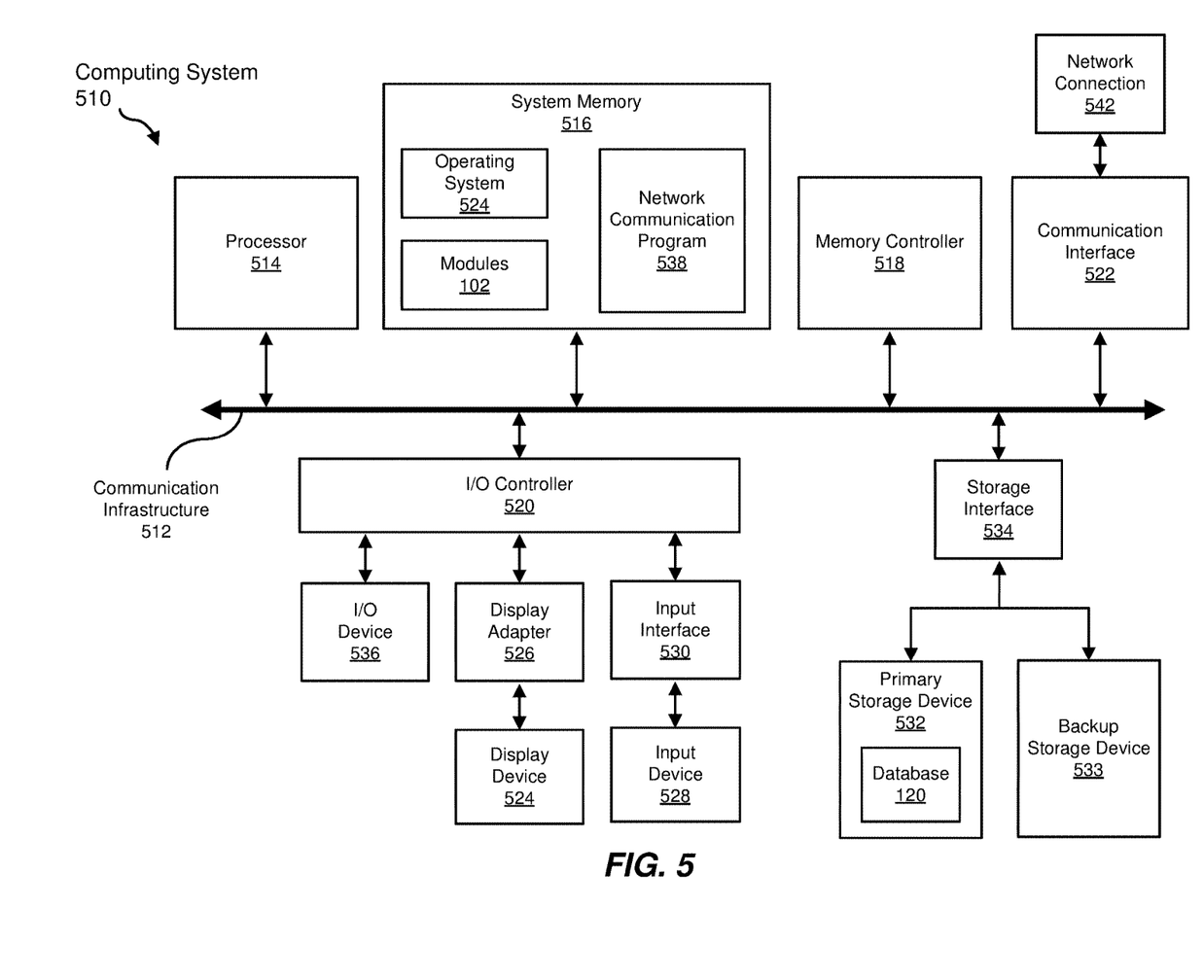
FIG. 5 is a block diagram of an example computing system capable of implementing one or more of the embodiments described and/or illustrated herein.

FIG. 5 is a block diagram of an example computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the example embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In some examples, system memory 516 may store and/or load an operating system 524 for execution by processor 514. In one example, operating system 524 may include and/or represent software that manages computer hardware and software resources and/or provides common services to computer programs and/or applications on computing system 510. Examples of operating system 624 include, without limitation, LINUX, JUNOS, MICROSOFT WINDOWS, WINDOWS MOBILE, MAC OS, APPLE'S 10S, UNIX, GOOGLE CHROME OS, GOOGLE'S ANDROID, SOLARIS, variations of one or more of the same, and/or any other suitable operating system.

In certain embodiments, example computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

As illustrated in FIG. 5, computing system 510 may also include at least one display device 524 coupled to I/O controller 520 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, example computing system 510 may also include at least one input device 528 coupled to I/O controller 520 via an input interface 530. Input device 528 generally represents any type or form of input device capable of providing input, either computer or human generated, to example computing system 510. Examples of input device 528 include, without limitation, a keyboard, a pointing device, a speech recognition device, variations or combinations of one or more of the same, and/or any other input device.

Additionally or alternatively, example computing system 510 may include additional I/O devices. For example, example computing system 510 may include I/O device 536. In this example, I/O device 536 may include and/or represent a user interface that facilitates human interaction with computing system 510. Examples of I/O device 536 include, without limitation, a computer mouse, a keyboard, a monitor, a printer, a modem, a camera, a scanner, a microphone, a touchscreen device, variations or combinations of one or more of the same, and/or any other I/O device.

Communication interface 522 broadly represents any type or form of communication device or adapter capable of facilitating communication between example computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

In some examples, system memory 516 may store and/or load a network communication program 538 for execution by processor 514. In one example, network communication program 538 may include and/or represent software that enables computing system 510 to establish a network connection 542 with another computing system (not illustrated in FIG. 5) and/or communicate with the other computing system by way of communication interface 522. In this example, network communication program 538 may direct the flow of outgoing traffic that is sent to the other computing system via network connection 542. Additionally or alternatively, network communication program 538 may direct the processing of incoming traffic that is received from the other computing system via network connection 542 in connection with processor 514.

Although not illustrated in this way in FIG. 5, network communication program 538 may alternatively be stored and/or loaded in communication interface 522. For example, network communication program 538 may include and/or represent at least a portion of software and/or firmware that is executed by a processor and/or Application-Specific Integrated Circuit (ASIC) incorporated in communication interface 522.

As illustrated in FIG. 5, example computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, database 120 from FIG. 1 may be stored and/or loaded in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 510 may be configured as an ASIC adapted to implement one or more of the example embodiments disclosed herein.

Figure 6:
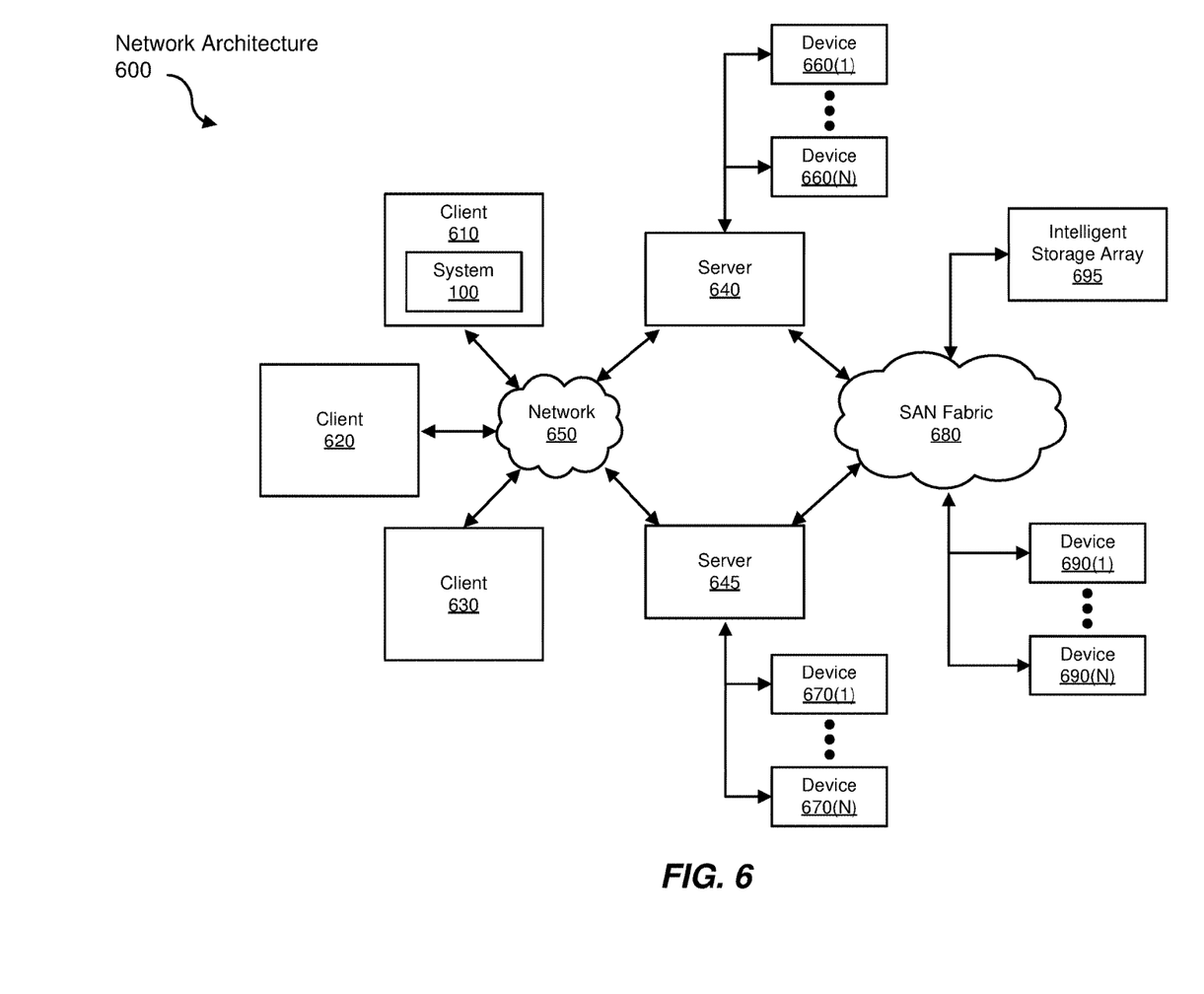
FIG. 6 is a block diagram of an example computing network capable of implementing one or more of the embodiments described and/or illustrated herein.

FIG. 6 is a block diagram of an example network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as example computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to example computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the example embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an example method for enforcing DLP policies during web conferences.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered examples in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive sensitive data to be transformed, transform the sensitive data, output a result of the transformation to a storage or output device, use the result of the transformation to identify a DLP policy, and store the result of the transformation in a server or database. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for enforcing data loss prevention (DLP) policies during web conferences, at least a portion of the method being performed by a computing device comprising at least one processor, the method comprising:
    detecting, by the computing device, an attempt by a presenter to initiate a web conference;
    determining that at least one item of content that a participant of the web conference attempts to share during the web conference contains sensitive data;
    identifying a DLP policy associated with the sensitive data; and
    securing the web conference against unauthorized dissemination of the sensitive data by:

ensuring a DLP software agent is dynamically running on at least one participant machine participating in the web conference;

enforcing the DLP policy on the participant machine using the DLP software agent;

subsequently determining that the item of content ceases to be shared during the web conference; and in response to determining that the item of content ceases to be shared, disabling the DLP software agent running on the participant machine in compliance with the DLP policy.

2. The method of claim 1, wherein the participant of the web conference comprises at least one of:

the presenter initiating the web conference; and an attendee of the web conference.

3. The method of claim 1, wherein determining that the item of content contains sensitive data comprises at least one of:

preemptively receiving the DLP policy from the presenter before initiating the web conference;

intercepting the item of content before sharing during the web conference;

analyzing the item of content; and identifying the sensitive data in the item of content.

4. The method of claim 1, wherein identifying the DLP policy associated with the sensitive data comprises:

identifying a security level of the sensitive data; and identifying a set of security controls for the sensitive data.

5. The method of claim 1, wherein the participant machine comprises at least one of:

a presenter machine used by the presenter initiating the web conference; and an attendee machine used by an attendee of the web conference.

6. The method of claim 1, wherein enforcing the DLP policy on the participant machine comprises:

identifying a permission level of a user of the participant machine; and selecting a security control based on the permission level of the user of the participant machine.

7. The method of claim 1, wherein ensuring the DLP software agent is running on the participant machine comprises at least one of:

detecting a DLP agent application on the participant machine;

detecting an integrated DLP agent for a web conference application; and initiating the DLP software agent on the participant machine.

8. The method of claim 1, wherein securing the web conference against unauthorized dissemination of the sensitive data comprises at least one of:

securing the item of content against unauthorized dissemination;

preventing recording of the web conference; and applying a security control to a recording of the web conference.

9. The method of claim 8, wherein securing the item of content against unauthorized dissemination comprises at least one of:

preemptively preventing the participant from sharing the item of content; and applying the security control to the item of content.

10. A system for enforcing data loss prevention (DLP) policies during web conferences, the system comprising:

a detection module, stored in memory, that detects, by a computing device, an attempt by a presenter to initiate a web conference;

a determination module, stored in memory, that determines that at least one item of content that a participant of the web conference attempts to share during the web conference contains sensitive data;

an identification module, stored in memory, that identifies a DLP policy associated with the sensitive data;

a security module, stored in memory, that secures the web conference against unauthorized dissemination of the sensitive data by:

ensuring a DLP software agent is dynamically running on at least one participant machine participating in the web conference;

enforcing the DLP policy on the participant machine using the DLP software agent;

subsequently determining that the item of content ceases to be shared during the web conference; and in response to determining that the item of content ceases to be shared, disabling the DLP software agent running on the participant machine in compliance with the DLP policy; and at least one processor that executes the detection module, the determination module, the identification module, and the security module.

11. The system of claim 10, wherein the participant of the web conference comprises at least one of:

the presenter initiating the web conference; and an attendee of the web conference.

12. The system of claim 10, wherein the determination module determines that the item of content contains sensitive data by at least one of:

preemptively receiving the DLP policy from the presenter before initiating the web conference;

intercepting the item of content before sharing during the web conference;

analyzing the item of content; and identifying the sensitive data in the item of content.

13. The system of claim 10, wherein the identification module identifies the DLP policy associated with the sensitive data by:

identifying a security level of the sensitive data; and identifying a set of security controls for the sensitive data.

14. The system of claim 10, wherein the participant machine comprises at least one of:

a presenter machine used by the presenter initiating the web conference; and an attendee machine used by an attendee of the web conference.

15. The system of claim 10, wherein enforcing the DLP policy on the participant machine comprises:

identifying a permission level of a user of the participant machine; and selecting a security control based on the permission level of the user of the participant machine.

16. The system of claim 10, wherein ensuring the DLP software agent is running on the participant machine comprises at least one of:

detecting a DLP agent application on the participant machine;

detecting an integrated DLP agent for a web conference application; and initiating the DLP software agent on the participant machine.

17. The system of claim 10, wherein the security module secures the web conference against unauthorized dissemination of the sensitive data by at least one of:
- securing the item of content against unauthorized dissemination;
- preventing recording of the web conference; and
- applying a security control to a recording of the web conference.

18. The system of claim 17, wherein securing the item of content against unauthorized dissemination comprises at least one of:
- preemptively preventing the participant from sharing the item of content; and
- applying the security control to the item of content.

19. A non-transitory computer-readable medium comprising one or more computer-executable instructions that, when executed by at least one processor of a computing device, cause the computing device to:
- detect, by the computing device, an attempt by a presenter to initiate a web conference;
- determine that at least one item of content that a participant of the web conference attempts to share during the web conference contains sensitive data;
- identify a DLP policy associated with the sensitive data; and
- secure the web conference against unauthorized dissemination of the sensitive data by:
  - ensuring a DLP software agent is dynamically running on at least one participant machine participating in the web conference;
  - enforcing the DLP policy on the participant machine using the DLP software agent;
  - subsequently determining that the item of content ceases to be shared during the web conference; and
  - in response to determining that the item of content ceases to be shared, disabling the DLP software agent running on the participant machine in compliance with the DLP policy.

* * * * *